US007621699B2

(12) United States Patent
McAuliffe et al.

(10) Patent No.: US 7,621,699 B2
(45) Date of Patent: Nov. 24, 2009

(54) ABRASIVE COATED FLUTED BIT WITH RECESSES

(75) Inventors: Patrick McAuliffe, Chicago, IL (US); Jie Liu, Lisle, IL (US)

(73) Assignee: Robert Bosch GmbH, Stuttgart (DE)

( * ) Notice: Subject to any disclaimer, the term of this patent is extended or adjusted under 35 U.S.C. 154(b) by 410 days.

(21) Appl. No.: 11/484,488

(22) Filed: Jul. 11, 2006

(65) Prior Publication Data

US 2008/0014033 A1 Jan. 17, 2008

(51) Int. Cl.
*B23C 5/10* (2006.01)
*B26D 1/12* (2006.01)

(52) U.S. Cl. .......................................... 407/53; 407/54

(58) Field of Classification Search ................. 407/110, 407/113, 109, 107, 80, 83, 118, 119
See application file for complete search history.

(56) References Cited

U.S. PATENT DOCUMENTS 1,977,845 A * 10/1934 Emmons .................... 76/108.2
2,988,859 A * 6/1961 Chaffey ...................... 451/481
3,548,476 A 12/1970 Cave et al.
3,913,196 A 10/1975 Maday
4,083,351 A 4/1978 Greenspan
4,174,915 A 11/1979 Peetz et al.
4,285,618 A 8/1981 Shanley, Jr.
4,480,949 A 11/1984 Van De Bogart
4,507,028 A 3/1985 Matsushita
4,661,064 A 4/1987 Beltramini
4,762,445 A * 8/1988 Bunting et al. .............. 408/144
4,802,799 A 2/1989 Rachev
4,810,136 A 3/1989 Paige
4,834,655 A 5/1989 Kyotani
5,000,630 A 3/1991 Riley et al.
5,094,573 A 3/1992 Hougen
5,226,760 A 7/1993 Nishimura
5,626,444 A 5/1997 Campian
5,807,032 A 9/1998 Abe
5,997,681 A * 12/1999 Kinzie ........................ 156/263
6,030,156 A * 2/2000 Andronica .................. 408/144
6,062,326 A * 5/2000 Strong et al. ................ 175/402
6,136,132 A * 10/2000 Kinzie ........................ 156/258
6,179,616 B1 1/2001 Danger
6,565,296 B2 5/2003 McKinley et al.
6,708,865 B2 * 3/2004 Yoshinaga ............... 228/112.1
6,899,494 B2 5/2005 Walrath (Continued)

OTHER PUBLICATIONS

Cho et al., *Aspects in Grinding of Ceramics*, Journal of the American Ceramic Society, Abstract, Sep. 1994, p. 2443, vol. 77 (2 pages).

(Continued)

*Primary Examiner*—Will Fridie, Jr.
(74) *Attorney, Agent, or Firm*—Maginot, Moore & Beck LLP

(57) ABSTRACT

A rotary tool accessory for shaping hard, brittle material is disclosed. In one embodiment, a work portion includes a first flute extending from one end portion of the work portion toward the other end of the work portion and a first land adjacent to the first flute. A first leading edge is located between the first flute and the first land and at least one recess extends from the first leading edge into the first land. An abrasive material is located at the surface of the first leading edge.

16 Claims, 5 Drawing Sheets

U.S. PATENT DOCUMENTS

| | | | | |
|---|---|---|---|---|
| 6,986,628 | B2 | 1/2006 | Mast et al. | |
| 7,104,160 | B2 * | 9/2006 | Fries et al. | 76/108.1 |
| 7,340,321 | B2 * | 3/2008 | Glaesser | 700/187 |
| 2002/0046629 | A1 * | 4/2002 | Borschert et al. | 76/108.1 |
| 2003/0002940 | A1 | 1/2003 | Forth et al. | |
| 2003/0147711 | A1 | 8/2003 | Risen, Jr. | |
| 2003/0223829 | A1 | 12/2003 | Craig | |
| 2005/0123363 | A1 | 6/2005 | Ahrnkiel et al. | |

OTHER PUBLICATIONS

Xu et al., *Effect of Microstructure on Material-Removal Mechanisms and Damage Tolerance in Abrasive Machining of Silicon Carbide*, Journal of the American Ceramic Society, 1995, pp. 2443-2448, 78 (9)(6 pages).

Itoh et al., *Characteristics of ELID grinding of GD2S1O5 by cast-iron bonded diamond wheel*, RIKEN Review, Apr. 2001, pp. 9-12, No. 34 (4 pages).

Rhee et al., *Brittle Fracture versus Quasi Plasticity in Ceramics: A Simple Predictive Index*, Journal of American Ceramic Society, 2001, 84 (3) pp. 561-565 (5 pages).

Sanchez et al., *Polishing Porcelain Tile*, American Ceramic Society Bulletin, vol. 81, No. 9, Sep. 2002, pp. 50-54 (5 Pages).

* cited by examiner

ABRASIVE COATED FLUTED BIT WITH RECESSES

BACKGROUND

This invention relates to the field of hand held rotary tools and related accessories.

Hand held rotary tools are widely used by many people, including craftspeople, homeowners, and artists. These rotary tools typically include an outer housing designed to be easily held within a human hand. The housing retains an electric motor which is operable to drive a rotatable chuck of the rotary tool. An accessory may be releasably secured to the chuck thereby enabling the rotary tool to rotatably drive the accessory.

The widespread use of hand held rotary tools is a result, in part, of the wide variety of accessories that may be used with the tools. The accessories include cut-off wheels, polishing wheels, grinding wheels, sanding discs and other cutting bits. In addition to the availability of specialized types of shaping accessories, shaping accessories may further be specifically designed for the particular type of material that is to be shaped. For example, U.S. Pat. No. 6,758,639 assigned to Credo Technology Corporation discloses a bit that is designed for use with drywall.

To cut sheetrock or drywall, a bit must be capable of first axially penetrating the drywall panel, and then making a lateral cut in the panel. The drywall bit can be used first to drill through the panel directly adjacent to an electrical outlet box, for instance. The bit is then conveyed in a direction perpendicular to the length of the bit, following the contour of the outlet box. The rotary tool is then manipulated to completely encircle the outlet box to cut the preferred opening in the drywall panel. In order to address these specific needs, the '639 patent discloses a bit with a single helical flute having a particular geometry. In one embodiment, the flute defines a cutting edge within a specific range of helix angles relative to the longitudinal axis of the bit. In another feature, the cutting edge of the flute is situated at a particular rake angle relative to the axis of the bit and the fluted portion of the bit has a web thickness that is based upon the cutting diameter of the bit.

In bits such as the bit disclosed in the '639 patent, cutting edges are defined by the junction of a flute and a land. The cutting edges penetrate the material being shaped and carve out a wedge of the material. While this mechanism is useful in relatively soft, ductile materials, it is not effective in harder and/or more brittle materials. For example, it is exceedingly difficult to cut through materials such as ceramics or hard crystalline material wherein the hardness of the material being shaped approaches the hardness of the drill bit. Likewise, it is difficult to achieve a cut that is acceptably smooth when working with brittle materials such as various types of glass.

Typically, two types of drill bits, the spear point drill bit and the core drill bit, are utilized when shaping ceramic materials. The spear point drill is shaped much like a spear point. The core drill has a hollow core with a cylindrical cutting edge surrounding the core. These bits may be modified to include a diamond abrasive on the cutting edge of the bit. While these bits are useful in boring operations such as making a hole through a material, neither bit can be used to cut along a line in the plane of the material such as to provide cutout areas in a tile.

An alternative to the bits set forth above is a frustum shaped bit with diamond grit adhered to the working portion of the bit. These bits provide the benefit of a harder abrasive material. The bits, however, do not cut through the material being shaped. Rather, the coated frustum bits grind material away from the work piece. Thus, the coated frustum bits can be used to provide cutout areas in a tile. The grinding of hard materials, however, generates a substantial amount of heat. The increased heat significantly impacts the longevity of the coated frustum bits. Additionally, the spaces between the grits tend to become blocked with dust, thereby reducing grinding capacity of the bit.

What is needed is a configuration for an accessory that reduces the problems associated with the shaping of hard or brittle materials such as tile. It would be beneficial if the accessory provided an increased rate of material removal. It would be further beneficial if the configuration of the accessory facilitated the reduction of the amount of heat generated during material removal and facilitated the dissipation of any such heat.

SUMMARY

In accordance with one embodiment of the present invention, there is provided a rotary tool accessory for shaping hard, brittle material that includes a work portion with a flute extending from one end portion of the work portion toward the other end of the work portion. A land is located adjacent to the flute and a leading edge is between the flute and the land. At least one recess is located in the leading edge and extends into the land and an abrasive material is located on the leading edge.

In accordance with another embodiment of the present invention, there is provided a hand held rotary tool accessory including a shaft with a work portion and a leading edge extending helically about the work portion. A first recess intersects the first flute and an abrasive material is on the work portion.

In yet another embodiment, a hand held rotary tool accessory includes a tool engaging portion and a working portion adjacent to the tool engaging portion. A flute is located in the working portion and a land is adjacent to the flute. A recess extends into the land from the flute and an abrasive material is on the land adjacent to the recess.

DESCRIPTION

Figure 1:
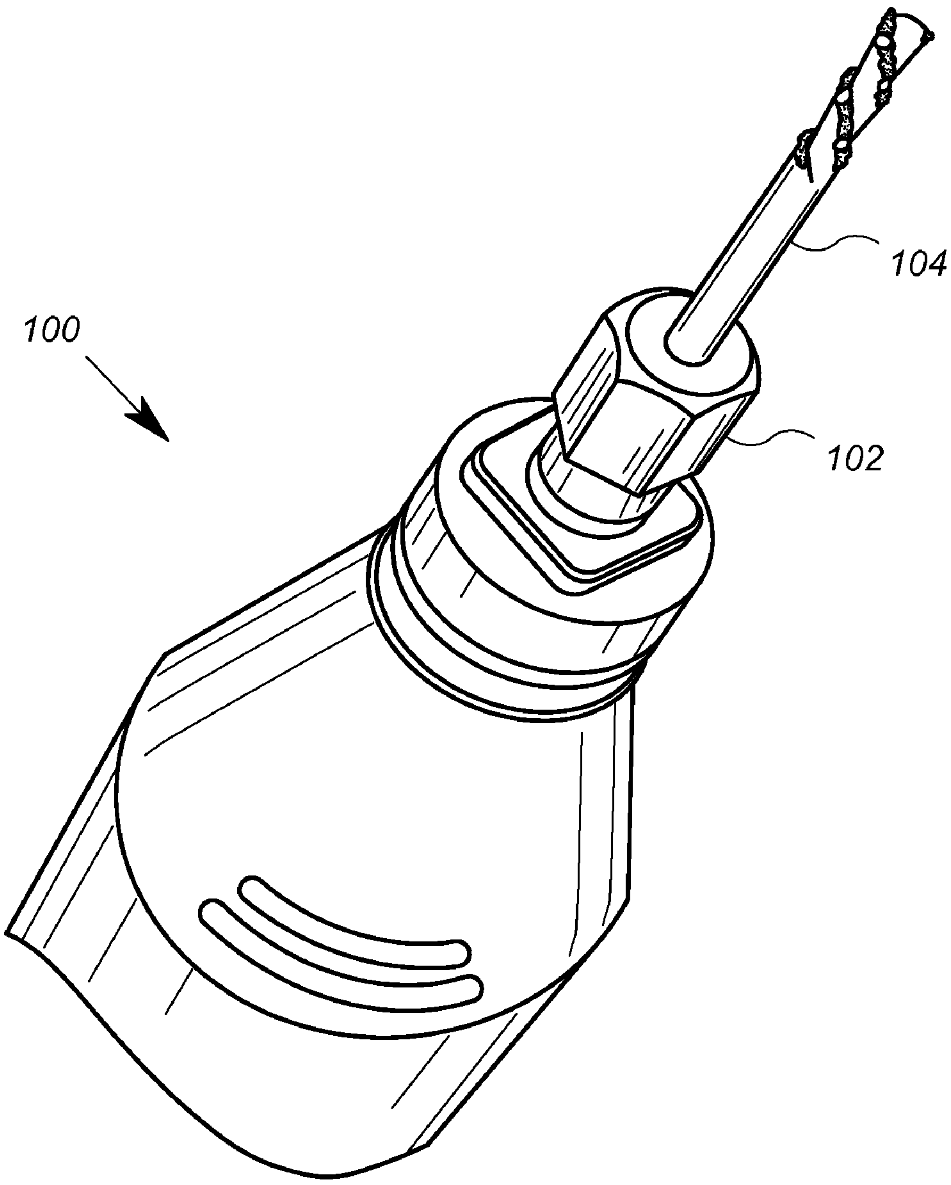
FIG. 1 shows a partial perspective view of a hand held rotary tool holding a bit with an interrupted leading edge including an abrasive layer in accordance with principles of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

FIG. 1 shows a partial perspective view of a hand held rotary tool 100. The rotary tool 100 includes a motor (not shown) for providing rotational movement to a chuck 102. A bit 104 is releasably coupled to the chuck 102. Operation of the motor in the rotary tool 100 rotates the chuck 102 which in turn rotates the bit 104.

Figure 2:
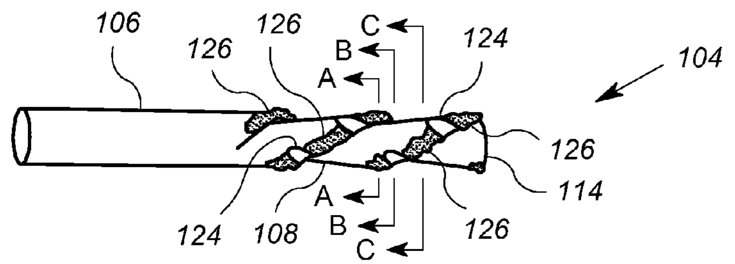
FIG. 2 shows a perspective view of the bit of FIG. 1.
Figure 3:
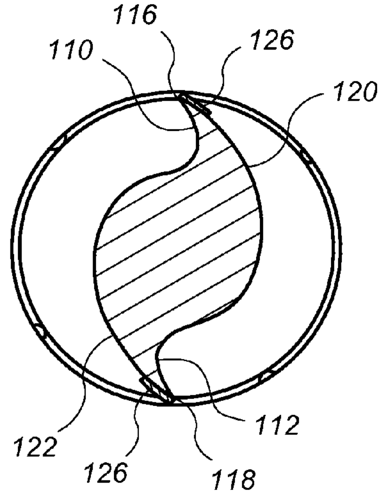
FIG. 3 shows a cross-sectional view of the bit of FIG. 1 showing multiple flutes on the bit in accordance with principles of the present invention.

As shown in FIG. 2, the bit 104 includes a tool-engaging portion 106 that is configured for being gripped within the chuck 102 of the rotary tool 100. The opposite end of the bit 104 is a work section 108. The work section 108 includes two flutes 110 and 112 seen most clearly in FIG. 3 which is a cross-sectional view of the bit 104 taken along the line A-A of FIG. 1. The flutes 110 and 112 extend helically about the bit 104 in a clockwise direction from the end 114 of the working section 108 towards the tool-engaging portion 106. The flutes 110 and 112 terminate at the leading edges 116 and 118. The leading edges 116 and 118 are defined by the flutes 110 and 112 on one side and the lands 120 and 122, respectively, on the opposite side. In alternative embodiments, a single flute or more than two flutes may be used, such flutes extending in either a clockwise or counter-clockwise direction about the bit.

A number of recesses 124 are formed in the leading edges 116 and 118 and extend into the lands 120 and 122. In the embodiment of FIG. 1, the recesses 124 are spaced equidistant from each other along the leading edges 116 and 118. In alternative embodiments, the recesses may be irregularly located along the leading edges. Additionally, while the recesses 124 are of uniform shape and size, they may alternatively be formed to have a variety of shapes and sizes.

The bit 104 may be formed from a suitable metallic blank of cold rolled steel or other material. The material is selected to provide the bit 104 with toughness. To provide the desired hardness, abrasive portions 126 are located on the leading edges 116 and 118 and extend into the flutes 110 and 112 and the lands 120 and 122 adjacent to the recesses 124. In this embodiment, the abrasive portions 126 are made from a diamond grit that is affixed to the leading edges 116 and 118 and a portion of the lands 120 and 122. The use of diamond grit is preferred when the bit 104 is used to machine hard materials such as ceramic. For other working materials, abrasives that are softer than diamond grit may be used. Other abrasives may include cubic boron nitride, silicon carbide grit and tungsten carbide grit.

Affixation of the abrasive portions 126 to the leading edges 116 and 118 may be accomplished by the use of an adherent mixed with the diamond grit. By way of example, but not of limitation, electroplating may be used to adhere abrasives to the bit 104, particularly when a cooling fluid is used to remove heat generated from use of the bit 104 such that the binding material utilized to adhere the abrasive material to the bit 104 would not be thermally degraded. Alternatively, the abrasive portions 126 may be adhered to the leading edges and/or the lands using a brazing process.

Figure 4:
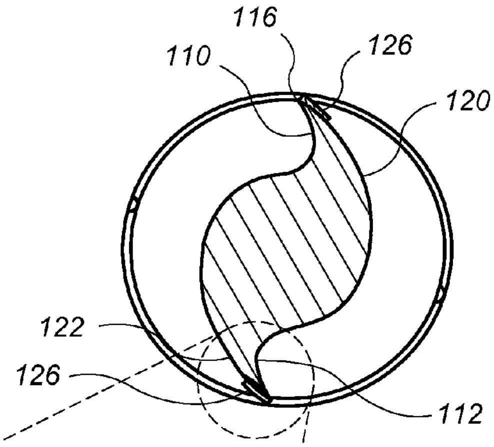
FIG. 4 shows a cross-sectional view of the bit of FIG. 1 showing a recess in a leading edge of the bit in accordance with principles of the present invention.

FIG. 4 is a cross sectional view of FIG. 2 taken along the line B-B. As shown most clearly in FIG. 5, which is a detail view of the recess 124 of FIG. 4, there is no adhesive material located in the flute 112 or the recess 124. Additionally, the abrasive portions 126 extend only partially along the land 122. Alternatively, the abrasive portions may be extended into the recess 124 to provide additional support for the abrasive portions 126 which are on the land 122.

Figure 5:
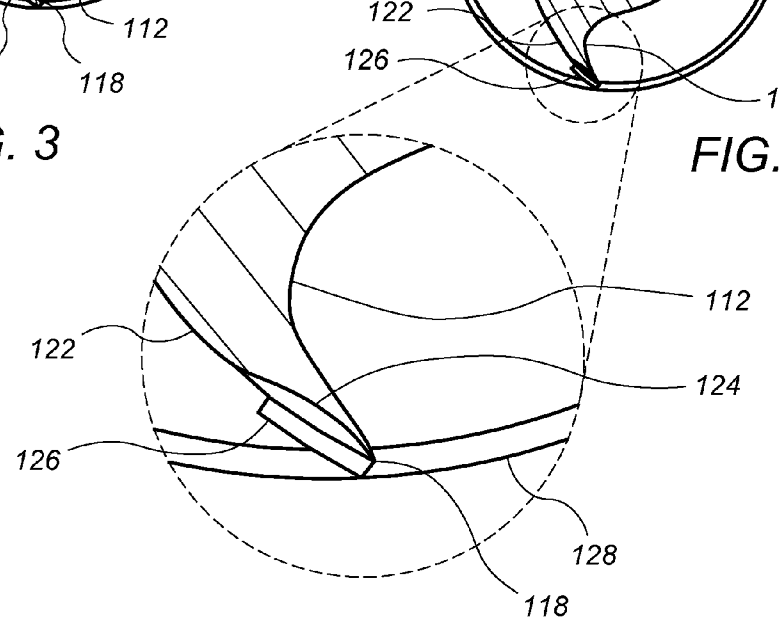
FIG. 5 shows a detail view of the leading edge and recess of the bit of FIG. 4.

FIG. 5 further shows that the periphery 128 of the bit 104 from an axial perspective is defined by the abrasive portions 126. Consequently, it is the abrasive portions 126, not the leading edge 116 or the leading edge 118, which contacts the work piece. Accordingly, at a given location on the work piece along a plane perpendicular to the longitudinal axis of the bit 104, the bit 104 will only contact the work piece along the periphery 128 of the bit 104 as the leading edges 116 and 118 pass over that location. During the remainder of the rotation, the flutes 110 and 112 are passing over the location. Accordingly, for a given plane intersecting the work piece and the bit, a gap exists between the work piece and the bit 104 during most of the rotation of the bit 104. Thus, no heat is generated at that location of the plane during most of the rotation of the bit 104. The recesses 124 provide a similar function since there is no contact with the work piece as the recesses 124 pass over the work piece. The recesses 124 thus interrupt the generation of heat along the leading edges 116 and 118.

The flutes 110 and 112 and the recesses 124 also aid in the removal of heat thereby reducing temperature increases in a material being worked and the bit 104. The flutes 110 and 112 and the recesses 124 provide a channel for heated fluids to escape along with the debris generated during the grinding process. Accordingly, as fluid flows into the grinding areas to replace the heated fluids, the bit 104 and the work piece are cooled. Of course, the cooling provided by naturally occurring air flow may be enhanced with forced fluid flow, either gaseous or liquid.

Figure 6:
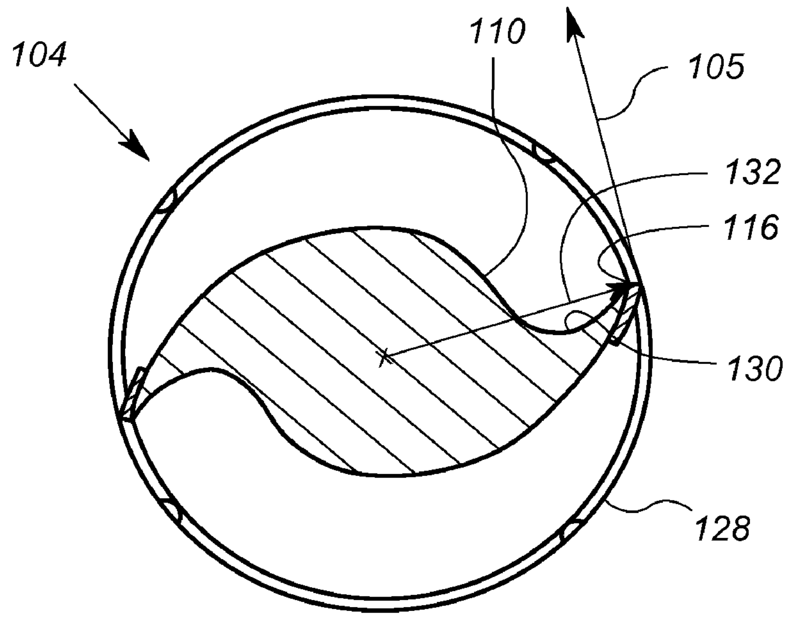
FIG. 6 shows a cross-sectional view of the bit of FIG. 1 showing a pocket defined by a flute of the bit in accordance with principles of the present invention.

The leading edges 116 and 118 are shaped to facilitate the flow of fluids and debris into the flutes 110 and 112 as shown in FIG. 6 which is a cross sectional view of the bit 104 taken along the line C-C of FIG. 1. As shown in FIG. 6, the bit 104 is designed to be rotated in the direction of the arrow 105. The flute 110 forms a pocket 130 below a line 132 drawn from the central longitudinal axis of the bit 104 to the point of the periphery 128 located directly outward of the forward portion of the leading edge 116. Accordingly, as debris is created, the rotation of the bit 104 urges the debris into the pocket 130 where it is swept out of the work section 108. This sweeping action is achieved so long as the pocket 130 does not extend significantly forward of the line 132.

In addition to their other functions, the flutes 110 and 112 and the recesses 124 are believed to assist in the shaping of a work piece. Specifically, the mechanism involved with shaping hard materials such as ceramic with an abrasive grit is brittle fracture. Brittle fracture can occur in the form of flakes when large grit sizes are used or powder when smaller grit sizes are used. In either case, material removal is believed to result from the generation of micro-fractures in the work piece as a grain of abrasive strikes the work piece. The flutes 110 and 112 and the recesses 124 are configured to enhance the brittle fracture of the material being shaped.

Figure 7:
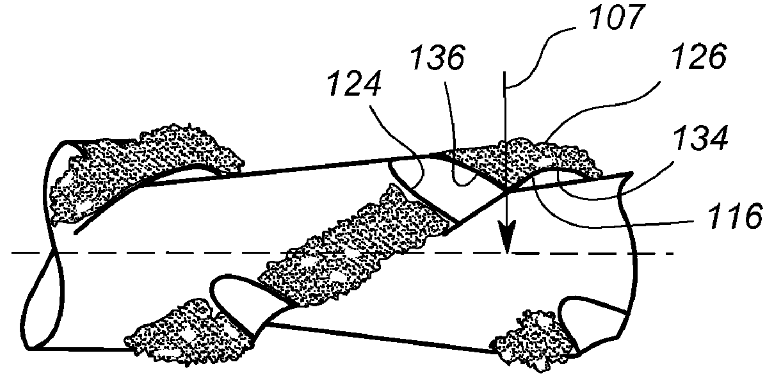
FIG. 7 shows an enlarged partial perspective view of the bit of FIG. 1.

As discussed above, the configuration of the flutes 110 and 112 and the recesses 124 result in a gap between the material being shaped and the bit 104 as these areas rotate over a location on the work piece. Consequently, with reference to FIG. 7, as the bit 104 rotates in the direction of the arrow 107, the abrasive portion 126 will contact the working material along the edge 134 formed above the leading edge 116. The angle of the edge 134 with respect to the central longitudinal axis of the bit 104 results in a downward thrust (to the right as shown in FIG. 7) on the work material as the bit 104 rotates. In contrast, the edge 136 of the abrasive portion 126 forms an angle with respect to the central longitudinal axis of the bit 104 that results in an upward thrust (to the left as shown in FIG. 7) on the work material as the bit rotates. Therefore, as the bit 104 rotates, the material being shaped is subjected to a series of impacts from the grits in the abrasive portions 126 that generate force in different directions, thereby increasing the effectiveness of the abrasive portions 126 in generating brittle fracture for the removal of material.

Figure 8:
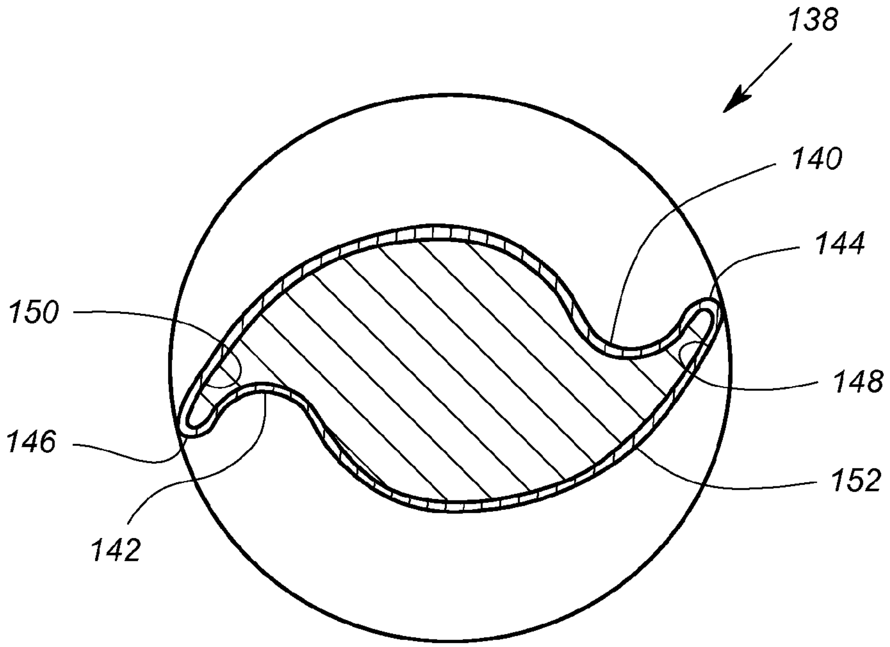
FIG. 8 shows an alternative bit with curved leading edges and a layer of abrasive material around the entire circumference of the bit in accordance with principles of the present invention.

Because the abrasive portions 126 effect the removal of the work material, the useful life of the bit 104 is dependent upon the amount of abrasive material located outward (away from the central longitudinal axis of the bit 104) of the leading edges 118 and 116. As evident from consideration of FIG. 5, the configuration of bit 104 results in only a small triangle of abrasive material that is available in the abrasive portion 126 outward of the leading edge 118. Once that triangle of material is worn away, the leading edge 118 will contact the material being shaped, thereby decreasing the effectiveness of the bit 104. FIG. 8 shows a cross sectional view of an alternative bit 138 which increases the amount of abrasive material available for shaping material.

The bit 138 shown in FIG. 8 is similar to the bit 104 in that it includes two flutes 140 and 142 which extend helically about the bit 138. The flutes 140 and 142 terminate in leading edges 144 and 146 which have recesses therein (not shown). The leading edges 144 and 146, unlike the leading edges 116 and 118, curve from the flutes 140 and 142 to lands 148 and 150. Additionally, the bit 138 includes an outer layer of abrasive material 152 along substantially the entire work portion of the bit 138.

The bit 138 thus provides semicircles of abrasive material 152 outward of the leading edges 144 and 146, substantially increasing the amount of abrasive material available for shaping a work piece when compared to the bit 104. When a large portion of a bit is to be coated such as with the bit 138, the abrasive material may be adhered to the bit through a process such as diamond plating, wherein the abrasive grit is suspended in a solution containing an appropriate metal ion such as nickel, which is plated to the substrate metal of the bit. Of course, the curved leading edges 144 and 146 may alternatively be coated with an abrasive material in a manner similar to the methods discussed above with respect to the bit 104. In another alternative embodiment, the leading edge is chamfered to provide for additional abrasive material.

Figure 9:
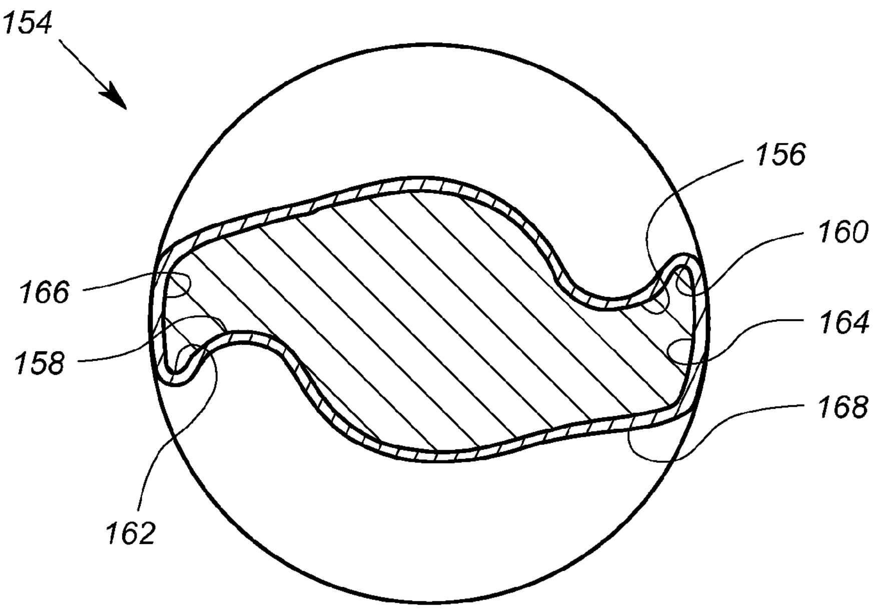
FIG. 9 shows a cross-sectional view of an alternative bit with curved leading edges, lands which extend along an arc centered on the longitudinal axis of the bit and a layer of abrasive material around the entire circumference of the bit in accordance with principles of the present invention.

FIG. 9 shows a bit 154 which also provides additional abrasive material. The bit 154 includes two flutes 156 and 158 which extend helically about the bit 154. The flutes 156 and 158 terminate in leading edges 160 and 162 which may have recesses therein (not shown). The leading edges 160 and 162 curve from the flutes 156 and 158 to lands 164 and 166. A layer of abrasive material 168 extends along substantially the entire work portion of the bit 154. When viewed in cross-section as in FIG. 9, the lands 164 and 166 define arcs about the longitudinal axis of the bit 154 extending away from the leading edges 160 and 162, respectively. The lands 164 and 166 thus provide an extended platform to support additional abrasives which can be used to shape a work piece. The lands 164 and 166 further provide increased contact time between the bit 154 and the work piece for a given rate of rotation as compared to the bit 104. Accordingly, as the lands are extended, increased heat will be generated. The contact stress on each grain, however, is substantially reduced.

Figure 10:
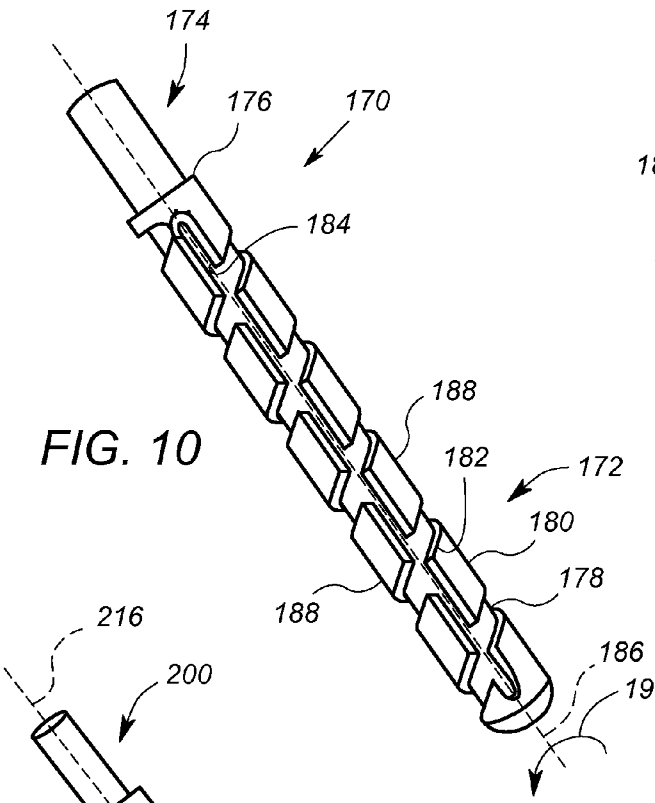
FIG. 10 shows a perspective view of an alternative bit with a layer of abrasive material around the entire circumference of the bit, a helically extending flute and a recess that repeatedly intersects the flute to form rhomboid lands in accordance with principles of the present invention.

The recesses in the leading edges of a bit may be extended so as to extend completely across the land adjacent to a particular flute. Referring to FIG. 10, the bit 170 includes a work portion 172 and a tool-engaging portion 174. Substantially the entire work portion 172 is coated with an adhesive material 176. The bit 170 includes a flute 178, although additional flutes may be incorporated. The flute 178 extends helically about the bit 170 and abuts a land 180 at a leading edge 182. The land 180 extends along substantially the entire work portion 172. A single recess 184 is substantially straight and extends along a path parallel to the longitudinal axis 186 of the bit 170.

Figure 11:
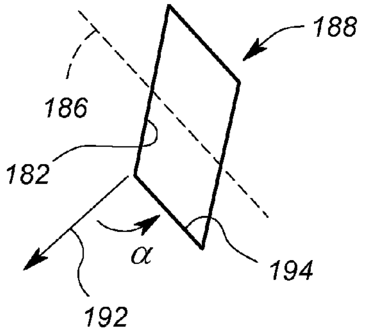
FIG. 11 shows a laid-open plan view of one of the rhomboid lands of the bit of FIG. 10.

The recess 184 thus intersects the flute 178 a number of times so as to divide the land 180 into a plurality of curved rhomboid lands 188. FIG. 11 depicts a laid-open plan view of one of the rhomboid lands 188. In operation, the bit 170 is rotated in the direction of the arrow 190 of FIG. 10. This corresponds to movement in the direction of the arrow 192 of FIG. 11. Accordingly, the recess 184 forms a second leading edge 194 which intersects the leading edge 182 formed by the flute 178. The second leading edge 194 in this embodiment is substantially perpendicular to the direction of rotation as indicated by the angle a formed between the arrow 192 and the second leading edge 194.

In the embodiment of FIG. 10, the land 180 comprises most of the surface of the work portion 172. Thus, the amount of abrasive material 176 available for shaping a work piece is significantly increased by the configuration of the bit 170 as compared with the bit 104. Additionally, as the proportion of the surface of the land 180 increases with respect to the entire surface of the work portion 172, the contact stress on each grain is substantially reduced, providing for extended life of the bit.

Those of ordinary skill in the art will appreciate that the number and size of the rhomboid lands 188 may be altered by changing the pitch of the flute 178. Moreover, increasing the number of flutes and/or recesses increases the number of rhomboid lands 188 and the width of the recess and the width of the flute may be modified to control the amount of heat and debris generated and the rate of heat and debris removal. Additionally, in contrast to the configuration of the flutes 110 and 112, of the bit 104, the flute 178 extends in a clockwise direction about the bit 170. Thus, the leading edge of the rhomboid land 188 formed by the flute 178 is on the side of the rhomboid land 188 closest to the tool-engaging portion 174.

Figure 12:
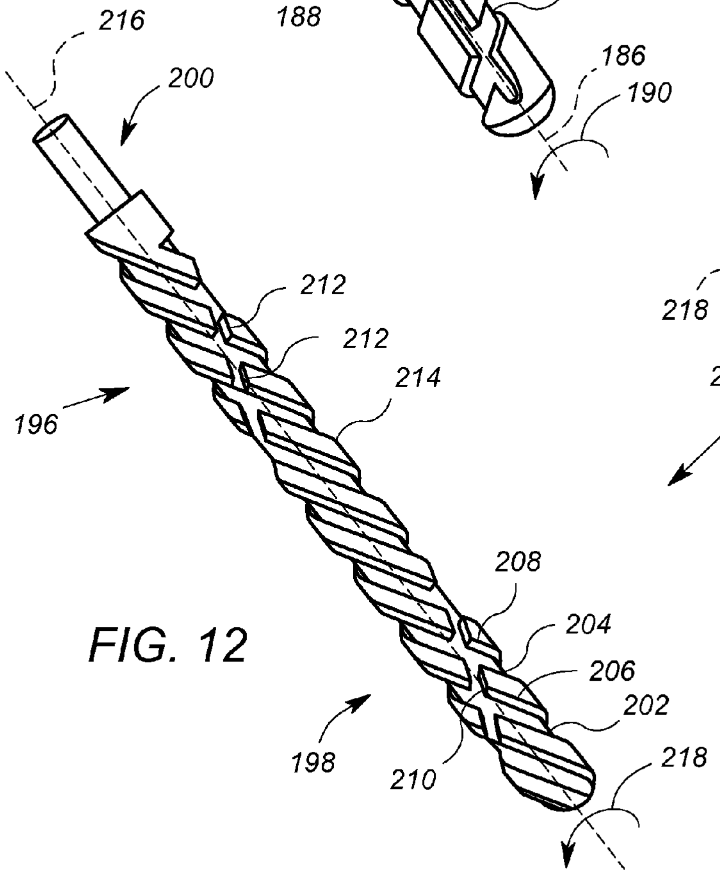
FIG. 12 shows a perspective view of an alternative bit with a layer of abrasive material around the entire circumference of the bit, two helically extending flutes and a recess extends helically about the bit with a pitch different from the pitch of the two flutes so as to repeatedly intersect the flutes to form rhomboid in accordance with principles of the present invention.

Moreover, the pitch of the recess in a bit may be altered to modify the angle of the second leading edge with respect to the direction of rotation. By way of example, FIG. 12 shows a bit 196 with a work portion 198 and a tool-engaging portion 200. Flutes 202 and 204 extend helically about the bit 196 in a counterclockwise direction from the work portion 198 toward the tool-engaging portion 200 so as to define leading edges 206 and 208, respectively. A single recess 210 extends helically about the bit 196 in a clockwise direction from the work portion 198 toward the tool-engaging portion 200 so as to define a leading edge 212.

Figure 13:
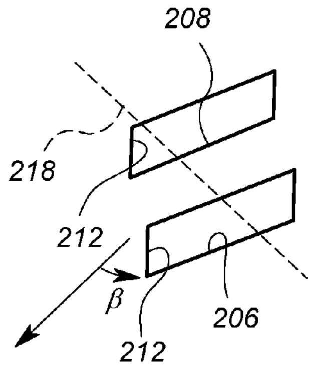
FIG. 13 shows a laid-open plan view of adjacent rhomboid lands of the bit of FIG. 12.

The recess 210 thus intersects the flutes 202 and 204 a number of times so as to divide the work portion 198 into a plurality of curved rhomboid lands 214. FIG. 13 depicts a laid-open plan view of adjacent rhomboid lands 214. In operation, the bit 196 is rotated about its axis 216 in the direction of the arrow 218 of FIG. 12. This corresponds to movement in the direction of the arrow 220 of FIG. 13. Accordingly, while the second leading edge 194 formed by the recess 184 in the bit 170 was substantially perpendicular to the direction of rotation of the bit 170, the leading edge 212 formed by the recess 198 forms an oblique angle β with respect to the direction of rotation of the bit 196 as indicated by the arrow 216.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A rotary tool accessory for shaping hard, brittle material, comprising:
- a work portion;
- a first flute extending from one end portion of the work portion toward the other end of the work portion;
- a first land adjacent to the first flute;
- a first leading edge portion defined by the first flute and the first land;
- a second leading edge portion defined by the first flute and the first land;
- at least one recess between the first leading edge portion and the second leading edge portion and extending from the first flute into the first land; and
- an abrasive material located at the surface of the first leading edge portion.

2. The rotary tool accessory of claim 1, wherein the first flute extends helically about the work portion.

3. The rotary tool accessory of claim 2, wherein the at least one recess extends completely though the first land.

4. The rotary tool accessory of claim 3, wherein the at least one recess extends helically about the work portion.

5. The rotary tool accessory of claim 2, wherein the work portion has a longitudinal axis and the at least one recess extends into the land along a line parallel to the axis of the work portion.

6. The rotary tool accessory of claim 5, wherein the at least one recess extends completely though the first land.

7. The rotary tool accessory of claim 1, wherein the at least one recess comprises a plurality of recesses, each of the plurality of recesses equally spaced from at least one other of the plurality of recesses.

8. The rotary tool accessory of claim 1, wherein the abrasive material comprises a diamond grit adhered to the surface of the first land.

9. The rotary tool accessory of claim 8, wherein the diamond grit is adhered to substantially the entire surface of the first land.

10. The rotary tool accessory of claim 9, wherein the diamond grit is adhered to substantially the entire surface of the working portion.

11. The rotary tool accessory of claim 1, further comprising:
- a second flute extending from the end portion of the work portion toward the other end of the work portion;
- a second land adjacent to the second flute;
- a third leading edge portion defined by the second flute and the second land;
- a fourth leading edge portion defined by the second flute and the second land; and
- at least one recess between the third leading edge portion and the fourth leading edge portion and extending into the second land; and
- an abrasive material located at the surface of the third leading edge portion.

12. A hand held rotary tool accessory comprising:
- a shaft with a work portion;
- a first flute extending helically about the work portion from a first end portion of the work portion toward an opposite end portion of the work portion;
- a first recess intersecting the first flute at a location spaced apart from the first end portion;
- an abrasive material on the work portion,
- land adjacent to the first flute; and
- a leading edge defined by the land and the first flute, wherein the shaft has a longitudinal axis and the first flute defines a pocket between the leading edge and the longitudinal axis in a plane normal to the longitudinal axis;

wherein:
- the land extends along an arc centered on the longitudinal axis; and
- the abrasive material extends from the leading edge onto the arced portion of the land.

13. A hand held rotary tool accessory comprising:
- a tool engaging portion;
- a working portion adjacent to the tool engaging portion;
- a flute having a first width and located in the working portion;
- a land adjacent to the flute and extending from a lower end portion of the working portion to an upper end portion of the working portion;
- a recess having a second width and extending into the land from the flute, wherein the second width is smaller than the first width; and
- an abrasive material on the land adjacent to and above the recess and adjacent to and below the recess.

14. The hand held rotary tool accessory of claim 13, wherein:
- the flute extends helically in a counterclockwise direction in the working portion toward the tool engaging portion; and
- the recess extends helically in a clockwise direction in the working portion toward the tool engaging portion.

15. The hand held rotary tool accessory of claim 13, wherein the land extends along an arc centered on a longitudinal axis of the accessory.

16. The hand held rotary tool accessory of claim 13, further comprising:
- a leading edge defined by the land and the flute, wherein the accessory has a longitudinal axis and the flute defines a pocket between the leading edge and the longitudinal axis in a plane normal to the longitudinal axis.

* * * * *